US008771067B2

(12) United States Patent
Burczyk et al.

(10) Patent No.: US 8,771,067 B2
(45) Date of Patent: Jul. 8, 2014

(54) GAMING SYSTEM AND A METHOD OF GAMING

(75) Inventors: Damien Burczyk, Henderson, NV (US); Mark Cass, Las Vegas, NV (US); Bradley Hendricks, Las Vegas, NV (US); Cash Imutan, Henderson, NV (US); Francis Styck, Henderson, NV (US)

(73) Assignee: Aristocrat Technologies Australia Pty Limited (AU)

( * ) Notice: Subject to any disclaimer, the term of this patent is extended or adjusted under 35 U.S.C. 154(b) by 0 days.

(21) Appl. No.: 13/437,493

(22) Filed: Apr. 2, 2012

(65) Prior Publication Data

US 2013/0260860 A1 Oct. 3, 2013

(51) Int. Cl.
*A63F 13/00* (2014.01)

(52) U.S. Cl.
USPC .................. 463/31; 463/16; 463/17; 463/18; 463/19; 463/20; 463/22; 463/30; 463/33

(58) Field of Classification Search
USPC .................. 463/16–20, 24–25, 29–31, 22, 33
See application file for complete search history.

(56) References Cited

U.S. PATENT DOCUMENTS

| | | | | |
|---|---|---|---|---|
| 8,118,670 | B2 * | 2/2012 | Griswold et al. | 463/29 |
| 8,128,495 | B2 * | 3/2012 | Vallejo et al. | 463/31 |
| 8,408,998 | B2 * | 4/2013 | Rasmussen et al. | 463/31 |
| 2004/0209667 | A1 * | 10/2004 | Emori et al. | 463/20 |
| 2004/0224747 | A1 * | 11/2004 | Okada | 463/16 |
| 2005/0153775 | A1 * | 7/2005 | Griswold et al. | 463/30 |
| 2005/0192090 | A1 * | 9/2005 | Muir et al. | 463/30 |
| 2009/0131145 | A1 * | 5/2009 | Aoki et al. | 463/20 |

* cited by examiner

*Primary Examiner* — Sunit Pandya
(74) *Attorney, Agent, or Firm* — McAndrews, Held & Malloy, Ltd.

(57) ABSTRACT

A gaming system is disclosed that comprises at least one mechanical reel, and a video display device disposed over the at least one mechanical reel. The video display device is controllable to display for each mechanical reel a virtual reel representative of the mechanical reel, and so as to be disposed in an operative first state wherein the at least one virtual reel is viewable on the video display device, or a substantially transparent second state. The gaming system also comprises a shutter device positioned between the video display device and the at least one mechanical reel and disposable in a first state wherein the at least one mechanical reel is revealed or a second state wherein the at least one mechanical reel is concealed. During use, either the mechanical reel(s) or the virtual reel(s) representative of the mechanical reel(s) are viewable by a player.

21 Claims, 7 Drawing Sheets

GAMING SYSTEM AND A METHOD OF GAMING

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to a gaming system and to a method of gaming.

It is known to provide a gaming system arranged to randomly display several symbols from a predetermined set of symbols and to determine a game outcome such as a game win based on the displayed symbols.

Such gaming systems may commonly be implemented as a stepper machine provided with reels with each reel carrying several symbols of the set, or a video machine wherein selected symbols are displayed on virtual reels on a graphical display device.

However, while such gaming systems provide users with enjoyment, a need exists for alternative gaming systems in order to maintain or increase player enjoyment.

BRIEF SUMMARY OF THE INVENTION

In accordance with a first aspect of the present invention, there is provided a gaming system comprising:

at least one mechanical reel having an associated set of symbols and arranged to controllably display at least one symbol selected from the set of symbols;

a video display device disposed over the at least one mechanical reel, the video display device being controllable:

to display for each mechanical reel a virtual reel and associated virtual symbols representative of the mechanical reel and associated symbols, and so as to be disposed in an operative first state wherein the at least one virtual reel is viewable on the video display device, or a substantially transparent second state wherein the at least one virtual reel is not viewable on the video display device; and a shutter device positioned between the video display device and the at least one mechanical reel and disposable in a first state wherein the at least one mechanical reel is revealed or a second state wherein the at least one mechanical reel is concealed;

wherein the system is arranged to control the shutter device and the video display device such that either the at least one mechanical reel or the at least one virtual reel representative of the at least one mechanical reel is viewable by a player.

In one arrangement, a plurality of mechanical reels and associated representative virtual reels are provided.

In one embodiment, each mechanical reel is aligned with an associated virtual reel such that when a virtual reel is viewable instead of a mechanical reel, the virtual reel appears to be displayed in the same position as the mechanical reel.

In one embodiment, the shutter device is electronically actuable such that the shutter device is disposable in the first state wherein the shutter device is substantially transparent or the second state wherein the shutter device is substantially opaque in response to application of an electrical signal.

In one embodiment, the shutter device is movable between a first position wherein an opaque shutter is disposed between the at least one mechanical reel and the video display device, and a second position wherein the opaque shutter is not disposed between the at least one mechanical reel and the video display device.

In one embodiment, the system is arranged such that when the or each virtual reel is displayed instead of the or each mechanical reel, the displayed symbols are the same. With this embodiment, at least some of the symbols on the or each virtual reel may be rearranged relative to the symbols shown on the mechanical reels.

In one embodiment, the system is arranged to modify lighting associated with the at least one mechanical reel or the video display device as or prior to at least one mechanical reel or at least one virtual reel becomes viewable.

In one embodiment, each virtual reel is a 3D representation of a respective mechanical reel.

In one embodiment, the video display device is controllable so as to replicate the appearance of physical components associated with the mechanical reels, such as edge lighting devices or heat sinks.

In one embodiment, the gaming system is arranged to implement a base game using the mechanical reels and to make the virtual reels viewable instead of the mechanical reels when a trigger condition occurs during the base game.

In an alternative embodiment, the gaming system is arranged to implement a base game using the virtual reels and to make the mechanical reels viewable instead of the virtual reels when a trigger condition occurs during the base game.

In one embodiment, the gaming system is arranged to commence special game mode in response to player input, based on the amount or type of bet placed, or when a special game is purchased by a player.

The trigger condition may be display of a particular symbol, or display of a defined symbol combination.

In accordance with a second aspect of the present invention, there is provided a method of gaming comprising:

providing at least one mechanical reel having an associated set of symbols;

using the at least one mechanical reel to controllably display at least one symbol selected from the set of symbols;

disposing a video display device over the at least one mechanical reel, the video display device being controllable:

to display for each mechanical reel a virtual reel and associated virtual symbols representative of the mechanical reel and associated symbols, and so as to be disposed in an operative first state wherein the at least one virtual reel is viewable on the video display device, or a substantially transparent second state wherein the at least one virtual reel is not viewable on the video display device; and positioning a shutter device between the video display device and the at least one mechanical reel, the shutter device disposable in a first state wherein the at least one mechanical reel is revealed or a second state wherein the at least one mechanical reel is concealed; and controlling the video display device and the shutter device such that either the at least one mechanical reel or the at least one virtual reel representative of the at least one mechanical reel is viewable by a player.

In accordance with a third aspect of the present invention, there is provided a computer readable device having a computer readable program code embodied therein for causing a computer to operate in accordance with the gaming system of the first aspect.

BRIEF DESCRIPTION OF SEVERAL VIEWS OF THE DRAWINGS

The present invention will now be described, by way of example only, with reference to the accompanying drawings, in which.

DETAILED DESCRIPTION OF THE INVENTION

Figure 1:
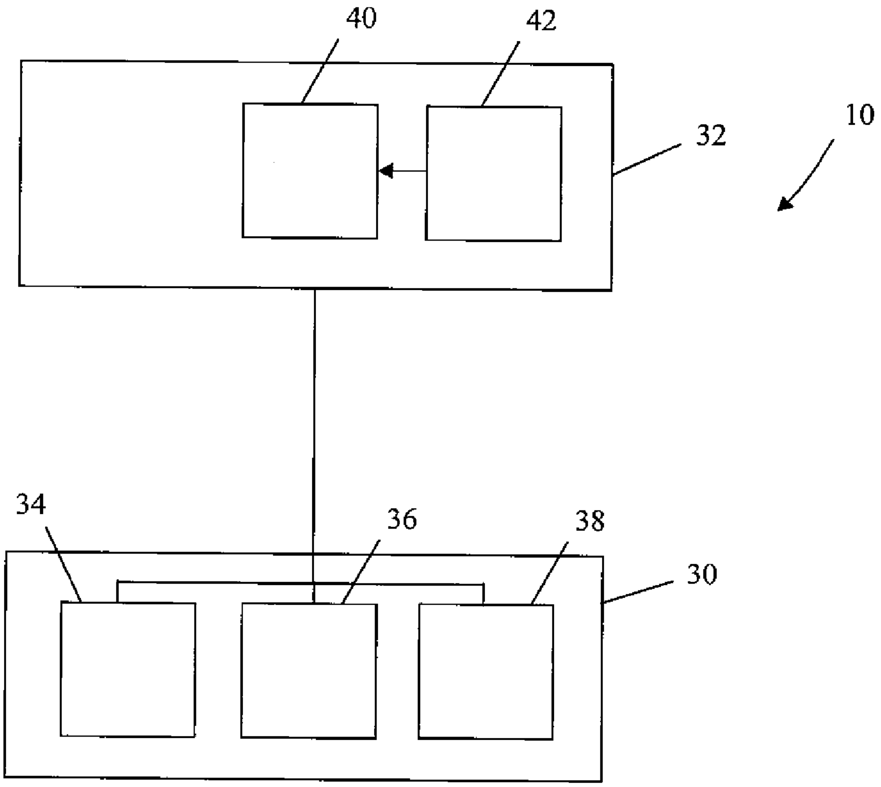
FIG. 1 is a schematic block diagram of components of a gaming system in accordance with an embodiment of the present invention.

The present gaming system operates such that during implementation of a game, a mechanical reel arrangement and a virtual reel arrangement representative of the mechanical reel arrangement are provided, with a shutter device disposed between the mechanical and virtual reel arrangements. The shutter device and the virtual reel arrangement are controllable so that the mechanical reel arrangement or the corresponding virtual reel arrangement is viewable by a player. In this way, it is possible to switch between the mechanical reel arrangement and the virtual reel arrangement and in so doing provide a player with the impression that the same reels and associated symbols are being used in the game despite the change between the mechanical or virtual arrangements.

It will be understood that the system enables manipulation of the symbols to occur during a game that would not be possible with a solely mechanical reel implemented game.

In one implementation, the mechanical reel arrangement comprises a plurality of rotatable symbol bearing reels, and the shutter device is controllable so as to be disposable in an open first state wherein the virtual reels are not visible and the mechanical reels are visible through the shutter device, or a closed second state wherein the virtual reels are visible and the mechanical reels are not visible.

In one conventional type of gaming machine, a spinning reel type game comprises a display area including 15 display positions, with each display position including one symbol. The display positions are arranged in five vertically disposed reels, with each reel corresponding with a display position group, and each reel having three visible display positions. After the reels are spun and subsequently stopped, the display positions show a random selection of symbols.

Generally, with such games, a plurality of win patterns in the form of win lines are defined which extend across the reels and include one display position from each reel. Typically the symbols that are disposed in a win line are compared with winning symbol combinations defined in a pay table so as to determine whether a player of the game should receive an award. For example, if winning symbol combinations are based on poker hands, a particular prize would be awarded if the win line comprises four aces. Other winning symbol combinations and corresponding prizes may also be defined.

With the present system, a base game is implemented using the mechanical reels during normal game mode, and a feature game is implemented using virtual reels representative of the mechanical reels during special game mode.

Referring to the drawings, there is shown a schematic block diagram of a gaming system 10 arranged to implement a probabilistic game of the type wherein several symbols from a set of symbols are randomly displayed, and a game outcome is determined on the basis of the displayed symbols. The system is of the type including multiple game modes, such normal game mode wherein a base game is implemented and special game mode wherein a feature game is implemented.

With the present embodiment, a conventional spinning reel type base game is implemented during normal game mode using a plurality of mechanical reels. The set of base symbols used during the base game include standard symbols and function symbols, and the game outcome is determined on the basis of the displayed standard symbols and the function associated with any displayed function symbol. For example, standard symbols may resemble fruit such as apples, pears and bananas with a win outcome being determined when a predetermined number of the same fruit appear on a display along a win line, or are displayed according to defined outcome patterns such as scattered, and so on. The function associated with a function symbol may be for example a wild function wherein display of the function symbol is treated during consideration of the game outcome as any of the standard symbols. A function symbol may be represented as the word "WILD", a star, or by any other suitable word or symbol. Other functions are also envisaged such as scatter functions, multiplier functions, repeat win functions, jackpot functions and feature commencement functions.

Referring to FIG. 1, a schematic diagram of components of a gaming system 10 in accordance with the present embodiment is shown. The components comprise a player interface 30 and a game controller 32. The player interface 30 is arranged to enable interaction between a player and the gaming system and for this purpose includes input/output components required for the player to enter instructions and play the game.

Components of the player interface 30 may vary but will typically include a credit mechanism 34 to enable a player to input credits and receive payouts, a video display device 36, and a game play mechanism 38 arranged to enable a player to input game play instructions.

The game controller 32 is in data communication with the player interface 30 and typically includes a processor 40 arranged to process game play instructions and output game player outcomes to the display 36. Typically, the game play instructions are stored as program code in a memory 42 that can also be hardwired. It will be understood that in this specification the term "processor" is used to refer generically to any device that can process game play instructions and may include a microprocessor, microcontroller, programmable logic device or other computational device such as a personal computer or a server.

Figure 2:
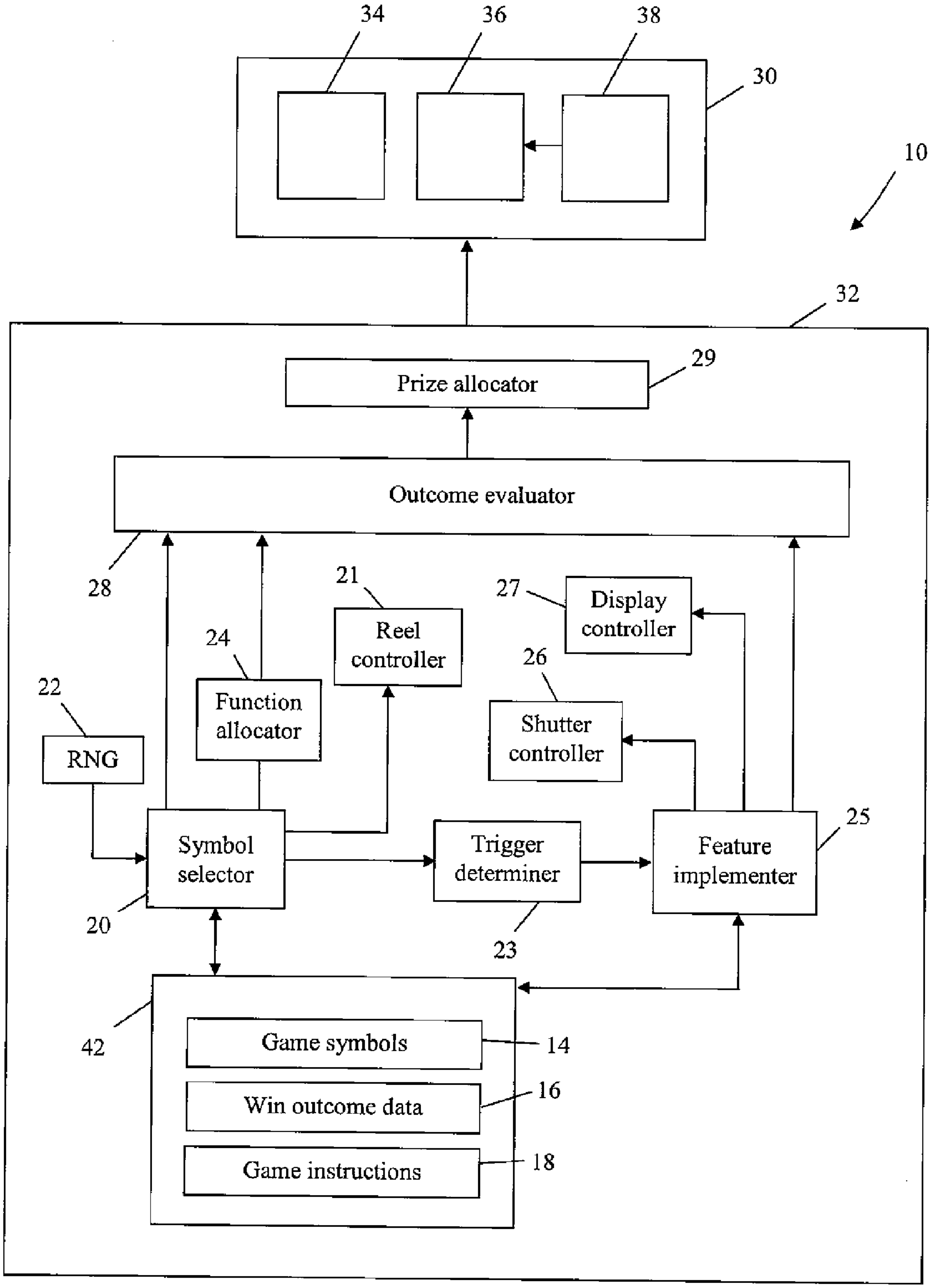
FIG. 2 is a schematic block diagram of functional components of a gaming system in accordance with an embodiment of the present invention.

A functional diagram illustrating operative components of the game controller 32 is shown in FIG. 2.

The memory 42 is arranged to store symbols data 14, win outcome data 16 indicative of win condition requirements for base and feature games, and game instruction data 18 indicative of game instructions usable by the gaming machine 10 to control operation of the base and feature games.

The game controller 32 includes a symbol selector 20 which is arranged during normal game mode to select several symbols for display to a player in a plurality of display positions on a plurality of mechanical reels, and a reel controller 21 arranged to control the mechanical reels so that the reels stop with the selected symbols displayed. In this example, the selection carried out by the symbol selector 20 is made using a random number generator 22.

It will be appreciated that the random number generator 22 may be of a type which is arranged to generate pseudo random numbers based on a seed number, and that in this specification the term "random" will be understood accordingly to mean truly random or pseudo random.

With this embodiment, the game controller 32 also comprises a trigger determiner 23 arranged to determine whether a trigger condition exists, and a feature implementer 25 arranged to implement a feature game when a trigger condition is determined to exist.

During a feature game, the feature implementer 25 interacts with a shutter controller 26 and a display controller 27.

The shutter controller 26 is arranged to control an electronic shutter device so as to dispose the shutter device in an open first state wherein the shutter device is substantially transparent, or a closed second sate wherein the shutter device is substantially opaque.

The display controller 27 is arranged to control the display device 36 so as to display representations of spinning reels corresponding to the mechanical reels when the shutter device is disposed in the second state, and in particular to control the stopping positions of the mechanical reels so that selected symbols are shown on the virtual reels.

The game controller 32 also comprises an outcome evaluator 28 which, in accordance with game instructions 18, determines game outcomes based on the symbols displayed during normal or special game mode.

The game controller 32 also comprises a prize allocator 29 arranged to allocate a prize to a player when a winning outcome exists.

In the present embodiment, the symbol selector 20, the trigger determiner 23, the function allocator 24, the feature implementer 25, the reel controller 21, the shutter controller 26, the display controller 27, the outcome evaluator 28, and the prize allocator 29 are at least partly implemented using the processor 40 and associated software although it will be understood that other implementations are envisaged.

The gaming system 10 can take a number of different forms.

In a first form, a player operable gaming device in the form of a stand alone gaming machine is provided wherein all or most components required for implementing the game are present in the gaming machine.

In a second form, a distributed architecture is provided wherein some of the components required for implementing the game are present in a player operable gaming device and some of the components required for implementing the game are located remotely relative to the gaming device. For example, a "thick client" architecture may be used wherein part of the game is executed on a player operable gaming terminal and part of the game is executed remotely, such as by a gaming server; or a "thin client" architecture may be used wherein most of the game is executed remotely such as by a gaming server and a player operable gaming terminal is used only to display audible and/or visible gaming information to the player and receive gaming inputs from the player.

However, it will be understood that other arrangements are envisaged. For example, an architecture may be provided wherein a gaming device is networked to a device server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 3:
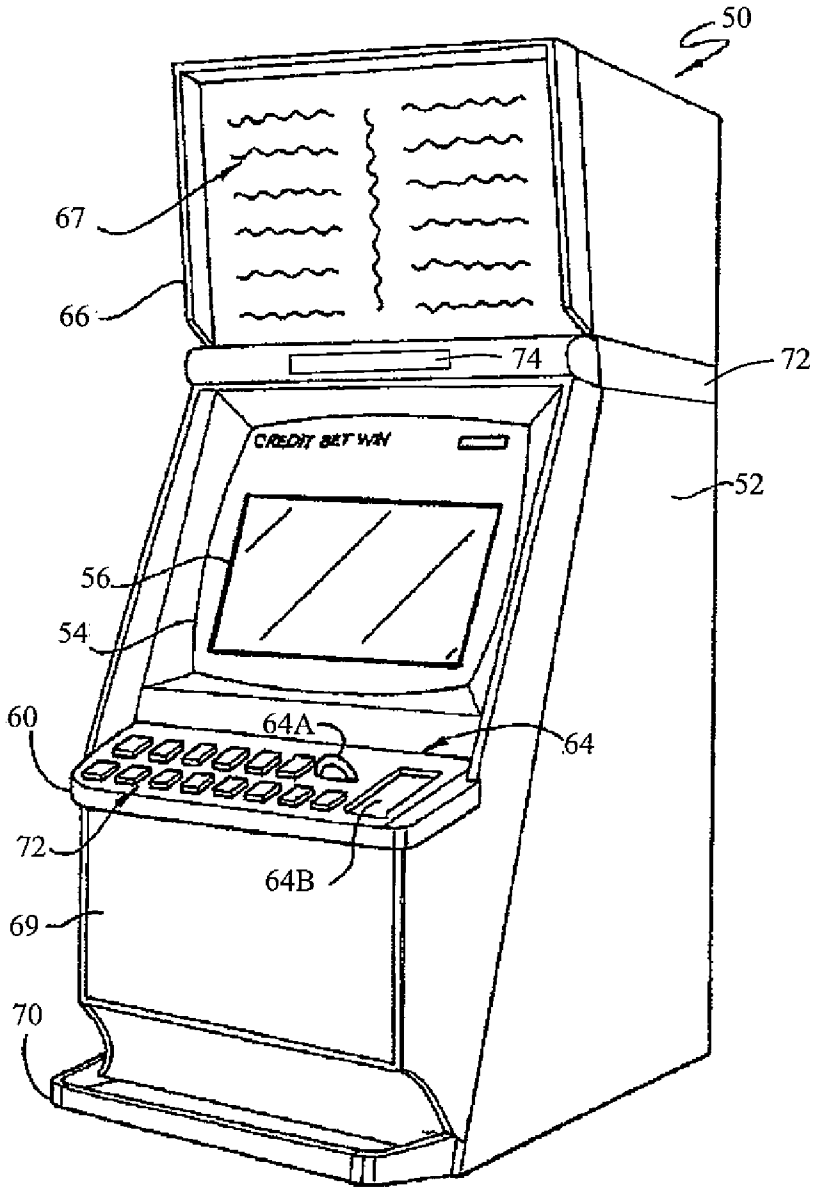
FIG. 3 is a diagrammatic representation of a gaming system in accordance with an embodiment of the present invention with the gaming system implemented in the form of a stand alone gaming machine.

A gaming system in the form of a stand alone gaming machine 50 is illustrated in FIG. 3. The gaming machine 50 includes a console 52 having a display arrangement 54 that is used to display a base game or a feature game 56. A mid-trim 60 of the gaming machine 50 houses a bank of buttons 62 for enabling a player to interact with the gaming machine, in particular during gameplay. The mid-trim 60 also houses a credit input mechanism 64 which in this example includes a coin input chute 64A and a bill collector 64B. Other credit input mechanisms may also be employed, for example, a card reader for reading a smart card, debit card or credit card.

A top box 66 may carry artwork 68, including for example pay tables and details of bonus awards and other information or images relating to the game. Further artwork and/or information may be provided on a front panel 69 of the console 52. A coin tray 70 is mounted beneath the front panel 69 for dispensing cash payouts from the gaming machine 50.

Figure 4:
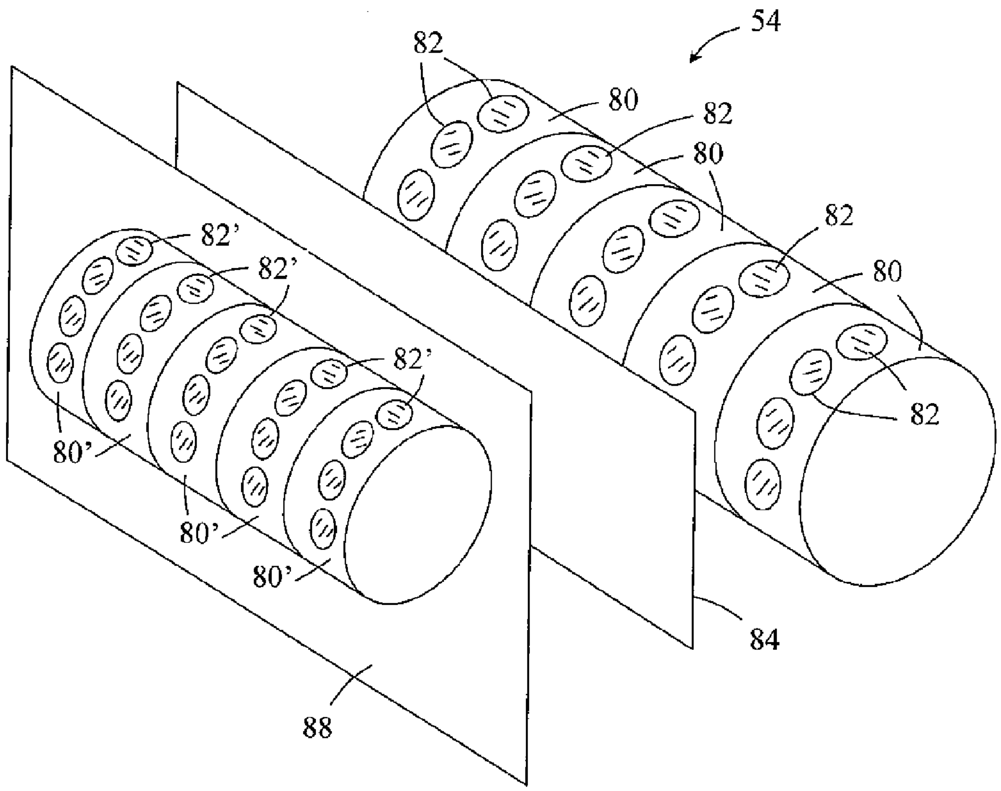
FIG. 4 is a diagrammatic representation of a display arrangement of the gaming system shown in FIG. 3.

As shown more particularly in FIG. 4, the display arrangement 54 comprises several rotatable mechanical reels 80 that are controllable using the reel controller 21 to spin and stop at a selected position. Each of the reels 80 has a plurality of associated symbols 82. The stopping position for each reel 80 is determined such that symbols selected by the symbol selector 20 are displayed when the reels stop.

Disposed in front of the mechanical reels 80 is a shutter device 84 disposable in an open first state or a closed second state. In the first state, the symbols 82 on the reels 80 are not concealed by the shutter device 84, and in the closed state, the symbols 82 are concealed by the shutter device 84.

In this example, the shutter device 84 is of electronic type and is therefore electronically controllable to dispose the shutter device 84 in the closed or open state. However, it will be understood that other arrangements are envisaged. For example, the shutter device may be mechanically implemented, for example such that the shutter device is movable between a position wherein the reels are concealed by the shutter device and a position wherein the reels are not concealed by the shutter device.

The display arrangement 54 also includes a video display device 88, which may incorporate a liquid crystal display, a plasma screen, or any other suitable video display unit. The video display device 88 is disposed in front of the shutter device 84 and is arranged to display virtual reels 80' representative of the mechanical reels 80 and including symbols 82' that are the same as the symbols 82 on the mechanical reels 80.

The video display device 84 is controllable so as to be disposed in an operative first state wherein the virtual reels are viewable on the video display device 84, and a substantially transparent second state wherein the virtual reels are not viewable on the video display device 84 and the mechanical reels are viewable through the video display device 84.

A player marketing module (PMM) 72 having a display 74 is connected to the gaming machine 50. The main purpose of the PMM 72 is to allow the player to interact with a player loyalty system. The PMM has a magnetic card reader for the purpose of reading a player tracking device, for example as part of a loyalty program. However other reading devices may be employed and the player tracking device may be in the form of a card, flash drive or any other portable storage medium capable of being read by the reading device. In this example, the PMM 62 is a Sentinel III device produced by Aristocrat Technologies Pty Ltd.

Figure 5:
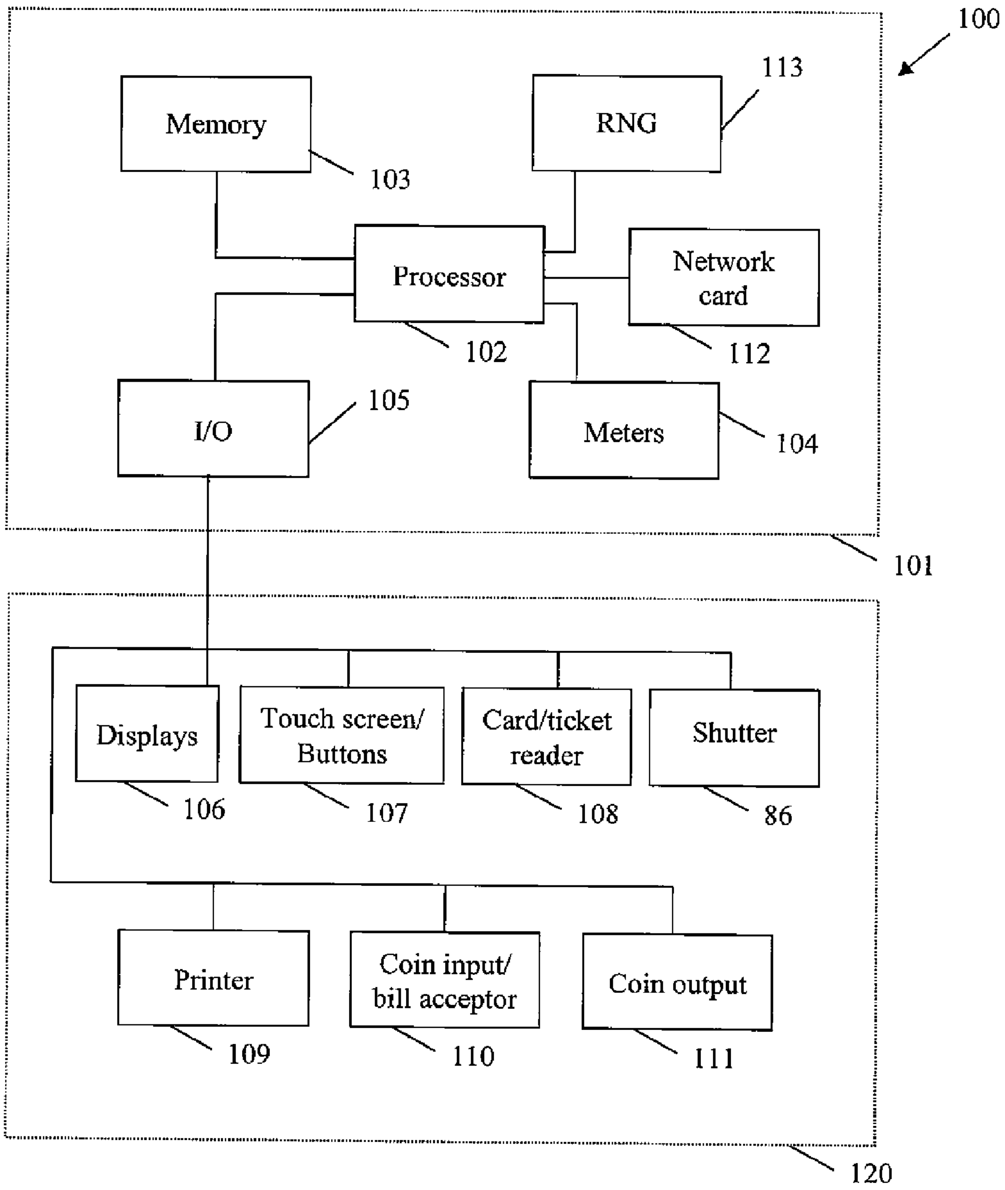
FIG. 5 is a schematic block diagram of operative components of the gaming machine shown in FIG. 3.

FIG. 5 shows a block diagram of operative components of a gaming device 100 which may be the same as or different to the gaming machine shown in FIG. 3.

The gaming machine 100 includes a game controller 101 having a processor 102. Instructions and data to control operation of the processor 102 in accordance with the present invention are stored in a memory 103 which is in data communication with the processor 102.

Typically, the gaming machine 100 will include both volatile and non-volatile memory and more than one of each type of memory, with such memories being collectively represented by the memory 103.

Figure 6:
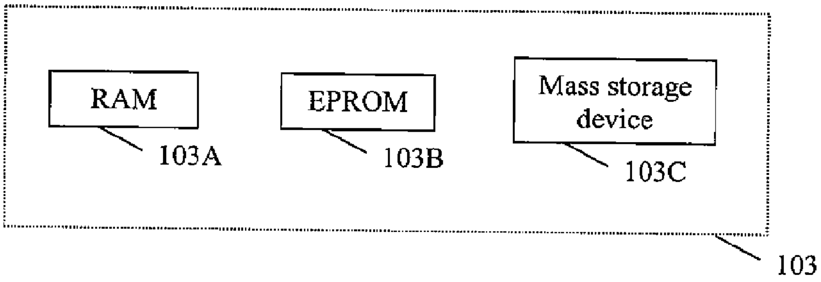
FIG. 6 is a schematic block diagram of components of a memory of the gaming machine shown in FIG. 3.

FIG. 6 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

The gaming machine has hardware meters 104 for purposes including ensuring regulatory compliance and monitoring player credit, an input/output (I/O) interface 105 for communicating with a player interface 120 of the gaming machine 100, the player interface 120 having several peripheral devices. The input/output interface 105 and/or the peripheral devices may be intelligent devices with their own memory for storing associated instructions and data for use with the input/output interface or the peripheral devices. A random number generator module 113 generates random numbers for use by the processor 102.

In the example shown in FIG. 5, the peripheral devices that communicate with the game controller 101 comprise one or more displays 106; a touch screen and/or bank of buttons 107; a card and/or ticket reader 108; a printer 109; a bill acceptor and/or coin input mechanism 110; a coin output mechanism 111; and a shutter 86. Additional hardware may be included as part of the gaming machine 100, or hardware may be omitted as required for the specific implementation.

In addition, the gaming machine 100 may include a communications interface, for example a network card 112. The network card may, for example, send status information, accounting information or other information to a central controller, server or database and receive data or commands from the central controller, server or database.

It is also possible for the operative components of the gaming machine 100 to be distributed, for example input/output devices 106,107,108,109,110,111 may be provided remotely from the game controller 101.

Figure 7:
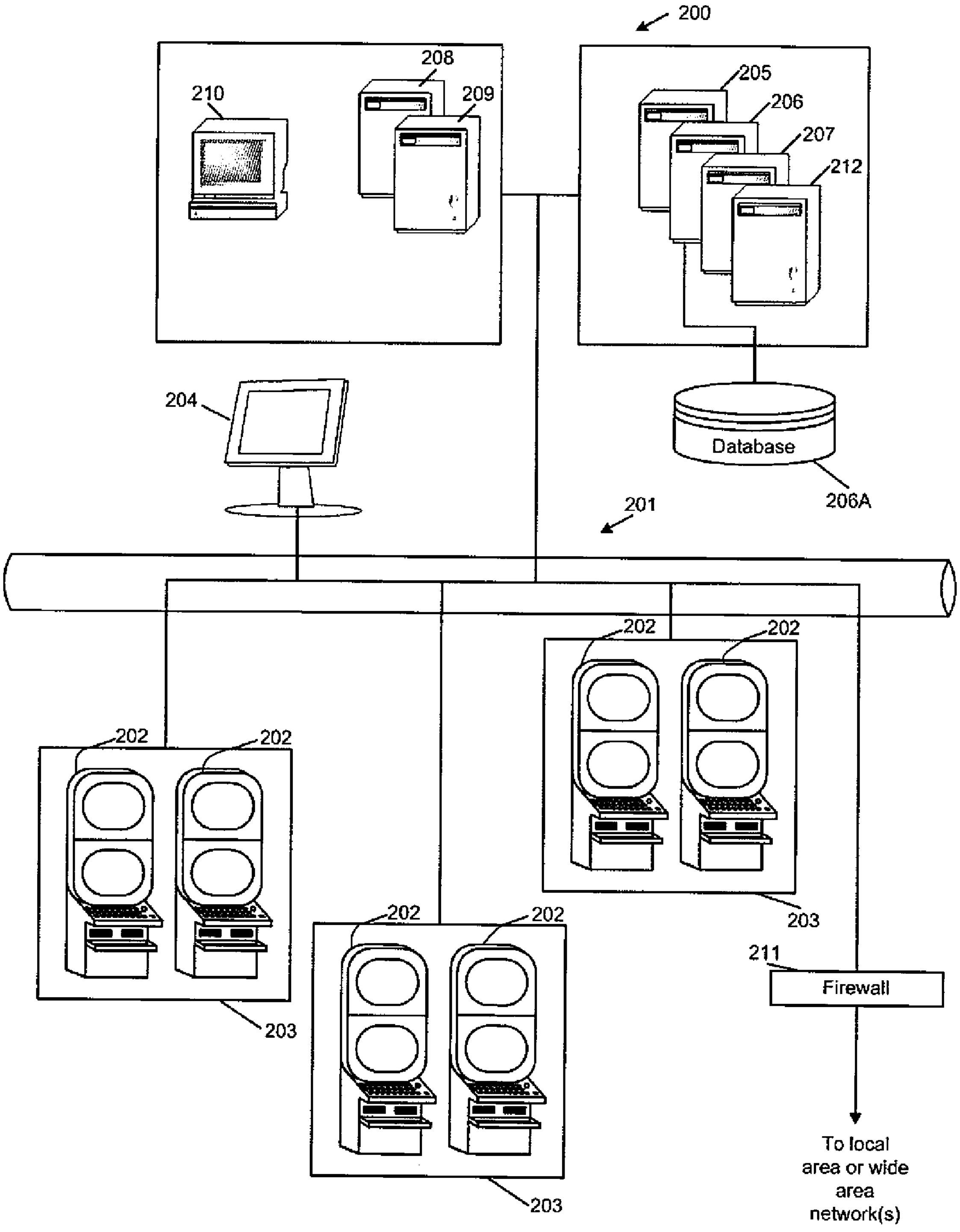
FIG. 7 is a schematic diagram of a gaming system in accordance with an alternative embodiment of the present invention wherein the gaming system is implemented over a network.

FIG. 7 shows a gaming system 200 in accordance with an alternative embodiment. The gaming system 200 includes a network 201, which for example may be an Ethernet network, a LAN or a WAN. In this example, three banks 203 of two gaming machines 202 are connected to the network 201. The gaming machines 202 provide a player operable interface and may be the same as the gaming machines 40,100 shown in FIGS. 3 and 5, or may have simplified functionality depending on the requirements for implementing game play. While banks 203 of two gaming machines are illustrated in FIG. 7, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server 205 and the gaming machine 202 implement part of the game, they collectively provide a game controller. A database management server 206 may manage storage of game programs and associated data for downloading or access by the gaming devices 202 in a database 206A. Typically, if the gaming system enables players to participate in a Jackpot game, a Jackpot server 207 will be provided to monitor and carry out the Jackpot game.

In a variation of the above thick client embodiment, the gaming machine 202 may implement the game, with the game server 205 functioning merely to serve data indicative of a game to the gaming machine 202 for implementation.

With this implementation, a data signal containing a computer program usable by the client terminal to implement the gaming system may be transferred from the game server to the client terminal, for example in response to a request by the client terminal.

In a thin client embodiment, the game server 205 implements most or all of the game played by a player using a gaming machine 202 and the gaming machine 202 essentially provides only the player interface. With this embodiment, the game server 205 provides the game controller. The gaming machine will receive player instructions, and pass the instructions to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming system 200, including for example a gaming floor management server 208 and a licensing server 209 to monitor the use of licenses relating to particular games. An administrator terminal 210 is provided to allow an administrator to monitor the network 201 and the devices connected to the network.

The gaming system 200 may communicate with other gaming systems, other local networks such as a corporate network, and/or a wide area network such as the Internet, for example through a firewall 211.

A loyalty program server 212 may also be provided.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine.

Alternatively, a separate random number generator server could be provided.

Examples of specific implementations of the gaming system will now be described in relation to a stand alone gaming machine 50 although it will be understood that implementation may also be carried out using other gaming system architectures such as a network architecture of the type shown in FIG. 7.

The gaming system is operable in normal game mode and special game mode and may be arranged to commence special game mode when a predetermined game outcome occurs. Special game mode may comprise one or more free games.

Special game mode may commence automatically on the basis of a game event occurring during a base game, such as display of a particular symbol, based on game outcomes determined by the gaming system, or may be prompted by a player pressing a button on the gaming system 10 after the player has identified that a game outcome corresponding to special game mode requirements has occurred.

The gaming system 10 may also be arranged so as to determine eligibility for special game mode, for example based on the amount or type of bet placed, based on particular time periods and so on.

Special game mode may also be arranged to commence when a special game is purchased by a player.

Figure 8:
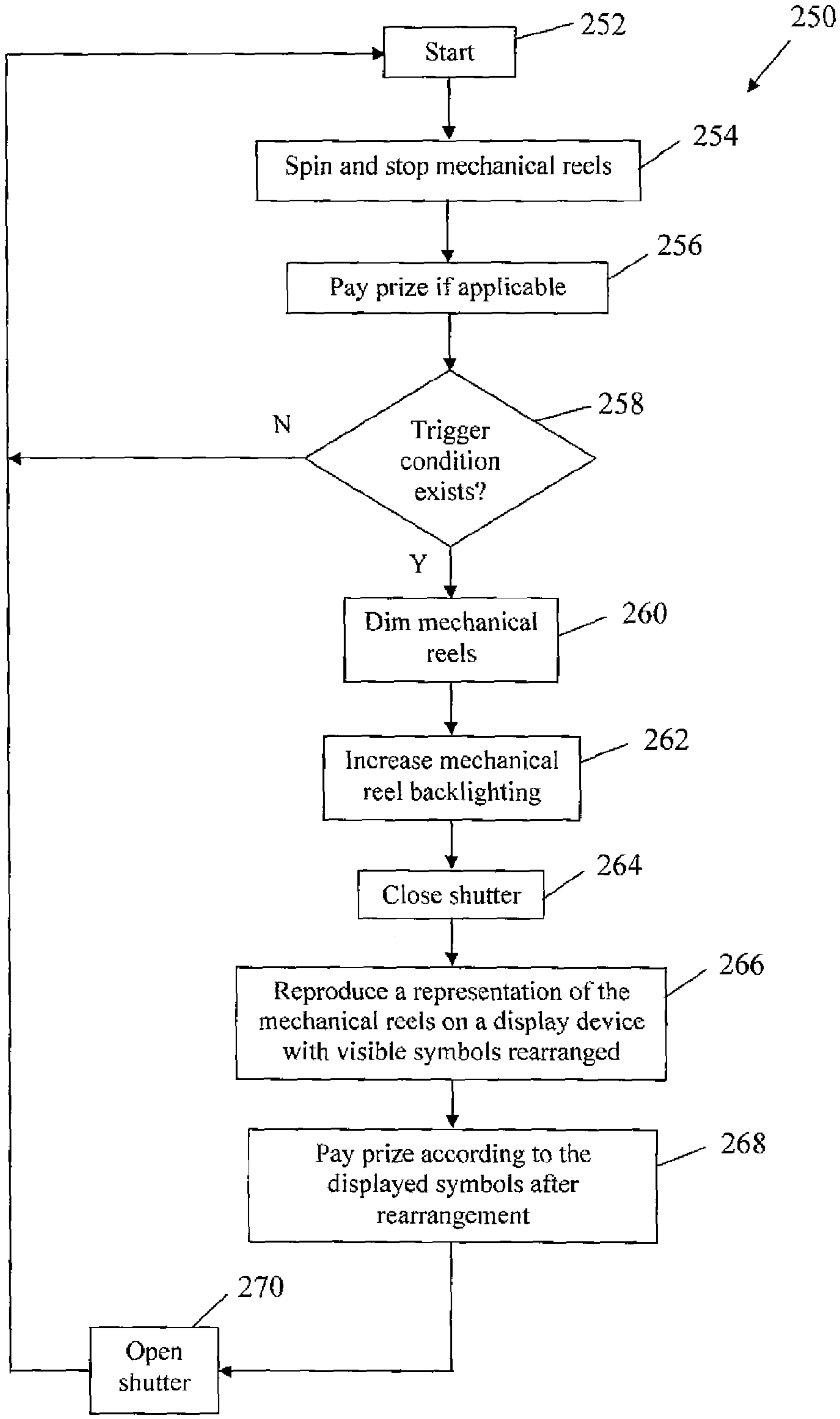
FIG. 8 is a flow diagram illustrating game play of a gaming system in accordance with an embodiment of the present invention.

A specific example will now be described in relation to flow diagram 250 shown in FIG. 8, which illustrates steps 252 to 270 of a method of gaming implemented by the gaming system according to the present embodiment.

During the base game, the shutter device 84 is in the open first state and the video display device 88 is disposed in a substantially transparent state. As such, the mechanical reels 80 are visible through the video display device 88 by the player. In this example, five mechanical reels 80 are provided and during the base game the mechanical reels 80 are rotated and subsequently stopped 254 to display standard symbols and one or more function symbols. Win outcomes are determined on the basis of the symbols visible at the display positions when the reels stop.

Typically, a player will purchase or otherwise obtain win entitlements such as several win lines which are used in the game to determine win outcomes. If the displayed symbols on the reels have symbols associated with a winning combination such as a winning combination disposed on a win line, the player wins a prize.

The outcome generator 28 determines whether the symbols displayed correspond to a winning outcome and, if a winning outcome exists, a prize associated with the winning outcome is awarded 256 to the player. This determination is made by comparing the displayed symbols with a pay table or similar.

If a predefined game outcome occurs 258 during the base game, such as display of a defined combination of symbols, the gaming system implements a feature game.

During implementation of the feature game, virtual reels 80' are displayed on the video display device 88 and are visible instead of the mechanical reels 80. The virtual reels 80'correspond to the mechanical reels 80 such that the virtual reels 80' are a virtual representation of the mechanical reels 80.

In order to provide a suitable transition from mechanical reels 80 to virtual reels 80', the system may be arranged to dim mechanical reel lighting 260, then increase the mechanical reel backlighting 262.

The shutter device 84 is then controlled so as to move to the second state 264, thereby concealing the mechanical reels 80 from view by the player, and representations of the mechanical reels are displayed on the video display device 88. In this way, the player is provided with a virtual representation of the reels used during the base game and the appearance to the player is of a virtual model of the mechanical reels 80.

In this example, the symbols displayed to the player on the video display device 88 are the same as the symbols displayed on the mechanical reels immediately prior to commencing the feature game. However, in this example, at least some of the symbols displayed on the video display device 88 are rearranged compared to the symbols displayed on the mechanical reels 80 in order to provide with player with an opportunity to obtain a different prize.

In this example, in order to increase the realism of the virtual reels 80' and the visual similarity of the virtual reels 80' with the mechanical reels 80, the virtual reels 80' may be represented using 3D techniques, and/or the perspective, lighting and appearance of the materials of the mechanical reels 80 may be represented on the video display device as accurately as possible.

The symbols displayed on the video display device are evaluated by the outcome evaluator 28 and the prize allocator 29 awards a prize, for example according to a defined pay table.

It will be understood that although the above example is described in relation to a gaming system wherein a base game is implemented using the mechanical reels 80 and with the shutter device 84 in an open first state, it will be understood that as an alternative a base game may be implemented using the video display device 88 and the associated virtual reels 80' and with the shutter device 84 in a closed second state. With this alternative arrangement, at commencement of a feature game, the shutter device would be caused to move to the open first state, the video display device 88 caused to move to the substantially transparent state, and the mechanical reels 80 used to implement the feature game.

It will be understood that in addition to virtual reels that closely resemble the mechanical reels 80, other visible aspects of the mechanical reel arrangement may also be replicated by the video display device 84. For example, edge lighting devices, heat sinks, or any other physical component that is viewable on at the display arrangement when the mechanical reels are used 80, may be represented on the video display device 88.

It will be appreciated that by alternating between mechanical reels and virtual reels that accurately represent the mechanical reels and are disposed at the same apparent location, the difference in appearance to a player between the mechanical and virtual reels is minimal. As a consequence, the player's attention is drawn more towards changes in the game rather than changes to the appearance of the reels used in the game. It also becomes possible to use mechanical reels for aspects of a game wherein modification of the symbol positions is not required, and to replace the mechanical reels with a substantially identical virtual copy of the reels for aspects of the game wherein modification of the symbols or symbol positions is required.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Modifications and variations as would be apparent to a skilled addressee are determined to be within the scope of the present invention.

The invention claimed is:

1. A gaming system for use in connection with a trigger condition, comprising:

a game controller;

at least one mechanical reel having an associated set of symbols and arranged to controllably display at least one symbol selected from the set of symbols at a stopped position;

a video display device disposed over the at least one mechanical reel, the video display device being controllable by said game controller:

to display for the at least one mechanical reel a respective virtual reel having virtual symbols that are the same as said associated symbols of the respective said mechanical reel, said video display device being disposable in an operative first state wherein the at least one virtual reel is viewable on the video display device, and being disposable in a substantially transparent second state wherein the at least one virtual reel is not viewable on the video display device; and a shutter device positioned between the video display device and the at least one mechanical reel, said shutter device being disposable in a first state wherein the at least one mechanical reel is revealed and disposable in a second state wherein the at least one mechanical reel is concealed from view; and wherein said controller is configured to control the shutter device and the video display device such that the at least one mechanical reel is viewable by a player for play of a base game to obtain a prize, and upon the trigger condition, (1) to dispose said shutter device in said second state concealing view of said at least one mechanical reel, and (2) to display the at least one virtual reel as a virtual representation of the at least one mechanical reel and (3) to rearrange at least one of the virtual symbols relative to the symbols displayed on the at least one mechanical reel so as to provide the player with an opportunity to obtain a different prize.

2. A gaming system as claimed in claim 1, comprising a plurality of mechanical reels and associated respective virtual reels.

3. A gaming system as claimed in claim 2, wherein at least some of the symbols on the virtual reel are rearranged relative to the symbols shown on the Mechanical reels.

4. A gaming system as claimed in claim 2, wherein the video display device is controllable so as to replicate the appearance of physical components associated with the mechanical reels.

5. A gaming system as claimed in claim 2, wherein the gaming system is arranged to implement a base game using the mechanical reels and to make the virtual reels viewable instead of the mechanical reels when a trigger condition occurs during the base game.

6. A gaming system as claimed in claim 2, wherein the gaming system is arranged to implement a base game using the virtual reels and to make the mechanical reels viewable instead of the virtual reels when a trigger condition occurs during the base game.

7. A gaming system as claimed in claim 2, wherein each mechanical reel is aligned with an associated virtual reel such that when a virtual reel is viewable, the virtual reel appears to be displayed in the same position as the mechanical reel.

8. A gaming system as claimed in claim 1, wherein the shutter device is electronically actuable such that the shutter device is disposable in the first state wherein the shutter device is substantially transparent or the second state wherein the shutter device is opaque.

9. A gaming system as claimed in claim 1, wherein the shutter device is movable between a first position wherein an opaque shutter is disposed between the at least one mechanical reel and the video display device, and a second position wherein the opaque shutter is not disposed between the at least one mechanical reel and the video display device.

10. A gaming system as claimed in claim 1, wherein the system is arranged to modify lighting associated with the at least one mechanical reel prior to the at least one virtual reel becoming viewable.

11. A gaming system as claimed in claim 1, wherein each virtual reel is a 3D representation of a respective mechanical reel.

12. A method of gaming for use with (1) a plurality of mechanical reels, each of the mechanical reels having an associated set of symbols; (2) a video display device being controllable to display for each mechanical reel a corresponding virtual reel with associated virtual symbols representative of said associated symbols, and having a first state wherein the virtual reel is viewable on the video display device, and a substantially transparent second state to permit view through the video display device and (3) a shutter device controllable to a first state that is open to permit view through the shutter device and a second state that is closed preventing view through the shutter device, the method comprising:

using the plurality of mechanical reels to controllably display at a stopped position a plurality of symbols each selected from its respective associated set of symbols, for play of a base game to obtain a prize;

disposing the video display device over the at least one plurality of mechanical reel reels, and controlling the video display device to its substantially transparent second state wherein the plurality of mechanical reels are viewable through the video display device;

positioning the shutter device between the video display device and the plurality of mechanical reels, and controlling the shutter device to its first state wherein the plurality of mechanical reels are revealed through the shutter device determining the occurrence of a trigger condition;

upon the trigger condition being determined, implementing a feature game using the video display device and the shutter device, said implementing including:

(1) controlling the shutter device to its second state wherein the plurality of mechanical reel is reels are concealed from view; and (2) displaying on the video display device a plurality of virtual reels, each virtual reel representative of one of the mechanical reels and having selected ones of the associated virtual symbols that are the same as the associated set of symbols shown on the mechanical reels in the stopped position and having at least some of the associated virtual symbols on at least one virtual reel being rearranged relative to the symbols shown on the mechanical reels in the stopped position, so as to provide the player with an opportunity to obtain a different prize.

13. A method as claimed in claim 12, comprising aligning each mechanical reel with an associated virtual reel such that when a virtual reel is viewable instead of a mechanical reel, the virtual reel appears to be displayed in the same position as the mechanical reel.

14. A method as claimed in claim 12, wherein the shutter device is electronically actuable such that the shutter device is disposable in the first state wherein the shutter device is transparent or the second state wherein the shutter device is opaque.

15. A method as claimed in claim 12, wherein the shutter device is movable between a first position wherein an opaque shutter is disposed between the at least one mechanical reel and the video display device, and a second position wherein the opaque shutter is not disposed between the at least one mechanical reel and the video display device.

16. A method as claimed in claim 12, comprising rearranging at least some of the symbols on the or each virtual reel relative to the symbols shown on the mechanical reels.

17. A method as claimed in claim 12, comprising modifying lighting associated with the at least one mechanical reel prior to the at least one virtual reel becomes viewable.

18. A method as claimed in claim 12, wherein each virtual reel is a 3D representation of a respective mechanical reel.

19. A method as claimed in claim 12, comprising controlling the video display device so as to replicate the appearance of physical components associated with the mechanical reels.

20. A method as claimed in claim 12, comprising implementing a base game using the mechanical reels and making the virtual reels viewable instead of the mechanical reels when a trigger condition occurs during the base game.

21. A method as claimed in claim 12, comprising implementing a base game using the virtual reels and making the mechanical reels viewable instead of the virtual reels when a trigger condition occurs during the base game.

* * * * *